US005257769A

United States Patent [19]

Nystrom

[11] Patent Number: 5,257,769

[45] Date of Patent: Nov. 2, 1993

[54] VEHICLE MOUNT ASSEMBLY

[75] Inventor: Robert E. Nystrom, Woodbridge, Va.

[73] Assignee: The United States of America as represented by the Secretary of the Army, Washington, D.C.

[21] Appl. No.: 843,323

[22] Filed: Feb. 28, 1992

[51] Int. Cl.[5] F16M 13/00

[52] U.S. Cl. 248/681; 248/225.31; 248/500; 248/503; 403/338

[58] Field of Search 248/225.31, 231, 316.1, 248/500, 503, 503.1, 510, 680, 681; 403/300, 309, 335, 338

[56] References Cited

U.S. PATENT DOCUMENTS 2,699,343 1/1955 Troeger et al. 403/338 X
2,978,265 4/1961 Cluff et al. 403/338
3,165,341 1/1965 Burns et al. 403/338 X
3,520,563 7/1970 Decker, Jr. 403/338 X
3,544,138 12/1970 Von Eiff 403/338 X

FOREIGN PATENT DOCUMENTS 571599 8/1945 United Kingdom 248/510

*Primary Examiner*—David A. Scherbel
*Assistant Examiner*—Derek J. Berger
*Attorney, Agent, or Firm*—Alain L. Bashore; Milton W. Lee; Anthony T. Lane

[57] ABSTRACT

An assembly for adaptably mounting observation equipment where the assembly is mated to an existing hole pattern on a vehicle. The assembly includes an adapter plate with holes for mating and a clamp ring for releasably mounting observation equipment to the plate. The vehicle may be a High Mobility Multi-purpose Wheeled Vehicle and the observation equipment may include night vision equipment.

2 Claims, 2 Drawing Sheets

40

41

42

VEHICLE MOUNT ASSEMBLY

BACKGROUND OF INVENTION

1. Field of the Invention

The field of the invention disclosed herein is directed to vehicle mount assemblies for observation equipment.

2. Description of Related Prior Art

Observation equipment, especially heavy precision types, generally require a steady base from which to be used. Such equipment is usually mounted on a stationary base such as a tripod which then must be disassembled so that individual pieces may be transported to another desired location. The time involved for such a procedure can be cumbersome and complicated. Most vehicles are not designed with mounts provided for particular equipment to be used so that a retrofit is required which again requires time and may be complicated.

SUMMARY OF THE INVENTION

The invention disclosed herein is directed to an assembly which adaptably mounts observation equipment utilizing an adapter plate with lower and upper portions which mate to an existing hole pattern on a vehicle mount. A clamp ring is positioned around a sleeve consisting of the upper portion of the plate, and which releasably mounts observation equipment to the plate. Mounting clips on the ring are retained in corresponding retaining clips that are mounted on the side of the plate. In the disclosed preferred embodiment, the existing hole pattern is located on a weapons station located atop a High Mobility Multipurpose Wheeled Vehicle.

The primary objective of this invention is to provide an apparatus for adaptably releasably mounting observation equipment easily to an existing hole pattern on a vehicle mount without the need to retrofit a vehicle for such use.

BRIEF DESCRIPTION OF THE DRAWINGS

A full and complete understanding of the invention can be obtained from the following detailed description of the invention when read in conjunction with the annexed drawing in which.

PREFERRED EMBODIMENTS

Figure 1:
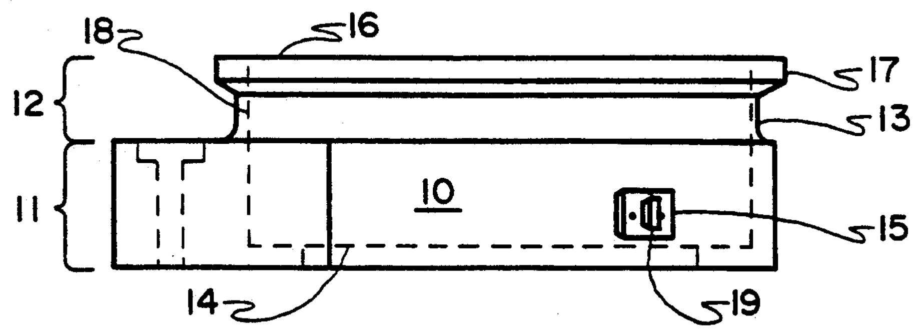
FIG. 1 shows a side view of the adapter plate.

The vehicle mount assembly of the present invention generally designated assembly 10 is shown in FIG. 1. Vehicle mount assembly includes a lower annular portion 11 and upper portion 12 which includes a sleeve 13 on top of which is a first radially extending flange shown as outwardly protruding flange 17 including and top surface 16. Lower annular portion 11 includes an inner wall 18 and an outer side wall 14 on which is removably mounted preferably at least three clamp ring retaining holders 15 with closed hooks 19.

Figure 2:
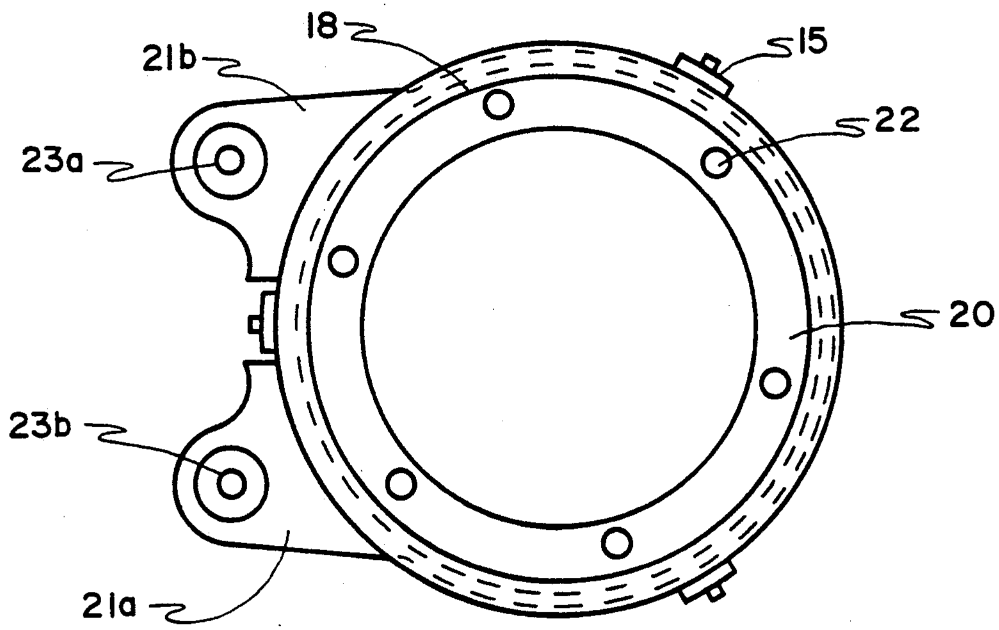
FIG. 2 shows a top view of FIG. 1.

Lower portion 11 includes a second radially extending flange depicted as radially inward projecting flange 20 shown in FIG. 2 that extends radially inward from inner sidewall 18 of lower portion 11 in FIG. 2. Bolt holes 22 are present in section 20 and are equal-distant from center. A third radially extending flange is shown as two tail sections **21*a* and 21*b* each containing a bolt holes 23*a* and 23*b* extend radially outward from an outer circumference of lower portion 11. The tail sections 21*a* and 21*b* function to enhance stability and to yield complete coverage of the entire hole pattern. It is understood that the invention is not limited to the particular embodiment described herein but may include multiple tail sections each with multiple holes sufficient to ensure stability to cover a particular existing hole pattern. The hole pattern shown in FIG. 2** is not symmetrical but is designed to approximate an un-symmetrical hole pattern of an existing hole pattern of the preferred embodiment.

Figure 3:
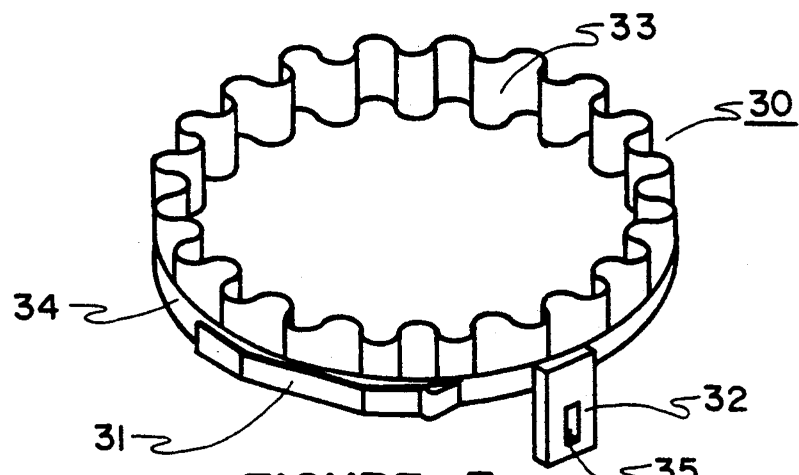
FIG. 3 shows the clamp ring.

FIG. 3 depicts a clamp ring generally designated as clamp ring 30, designated as clamp ring 30 includes a generally circular crimped band 33 around which is encircled by tension band 34 coupled to handle 31. Clips 32 loosely mount clamp ring 30 to plate 10 by retaining holders 15 shown in FIG. 1 through each clip hole 35. The mount clip 15 of FIG. 1 function to allow clamp ring 30 to be always loosely held around circular annular upper portion 12 of FIG. 1 when clamp ring 30 is opened for removal or insertion of the observation equipment. One of clips 32 is of a different size than other clips 32 found on clamp ring 30 such that when clamp ring 30 is installed in clamp ring retaining holders 15 of FIG. 1 handle 31 is specifically positioned around the circumference of circular annular upper portion 12 of FIG. 1 for ease of manual access.

An observation equipment base (not shown) with a lip (also not shown) mates with the circular annular upper portion 12 by sitting on top surface 16 of FIG. 1. The clamp ring when closed by closing handle 31 will tension band 34 which in turn tensions band 33 so as to engage; above the base set in the top surface 16 and below on sleeve 13 of FIG. 1. Clamp ring 30 is adapted to fit around the base of the observation equipment (not shown) being mounted to a vehicle surface 40, as shown in FIG. 4, whereby upon mating the base of the observation equipment to the upper circular annular portion 12 of the adapter plate 10 of FIG. 1 (as discussed above) and manipulating the handle 31 of the clip ring of FIG. 3, a radial force may be applied to the mated portions of said base and adapter plate to securely engage same (as discussed above).

In FIG. 3, a solid cover plate (not shown) may be used in lieu of the observation equipment and held by the clamp ring 30 to function a cover for the inner opening of the assembly when no observation equipment is mounted. Another alternative function of the cover plate is to act as an adapter for observation equipment which cannot by itself mate to the upper circular annular portion 12. Such observation equipment is then attached, by such means as (but not limited to) welding or bolting, so that the observation equipment can now be mated with the upper circular annular portion 12 of adapter plate 10 of FIG. 1.

Figure 4:
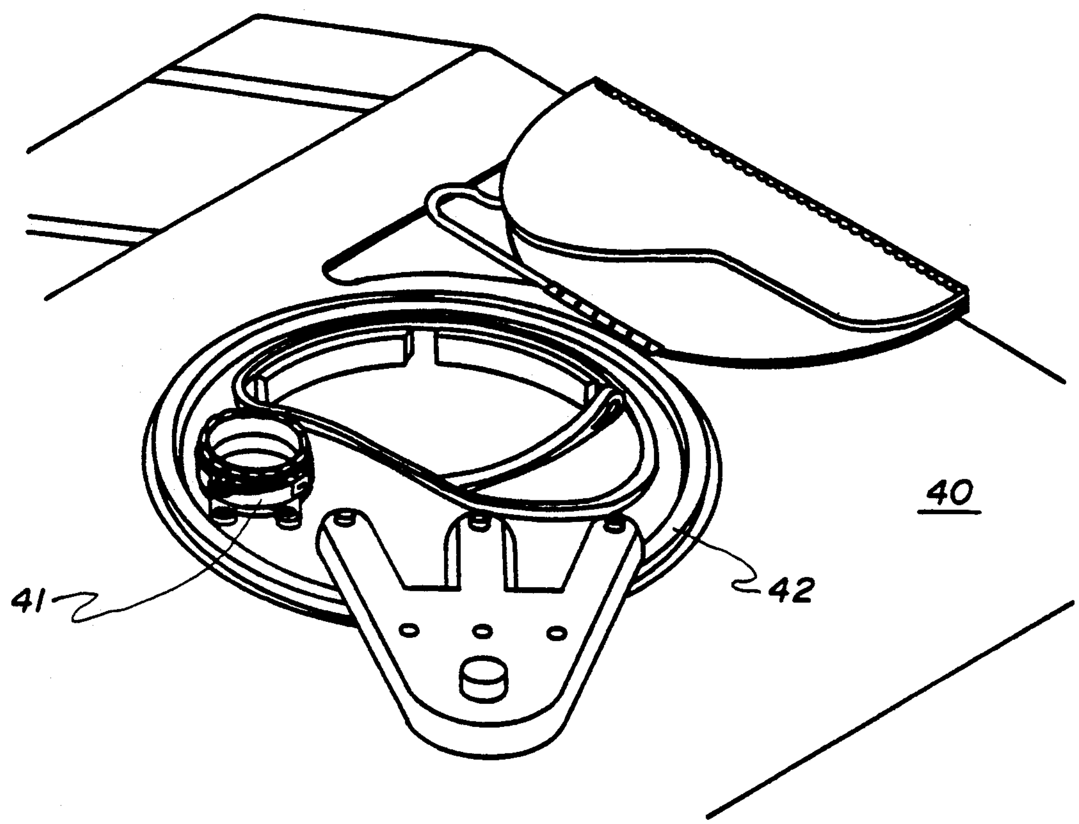
FIG. 4 shows the vehicle mount assembly mounted on the top of a High Mobility Multi-purpose Wheeled Vehicle.

The vehicle of the preferred embodiment may be, for instance, a High Mobility Multi-purpose Wheeled Vehicle (HMMWV) of which vehicle 40 is shown in FIG. 4 with the assembly 41 which is the integrated assembly shown in FIGS. 1, 2 and 3 as intended to be mounted on the vehicle. The existing hole pattern to which the adapter plate hole alignment pattern is mated is located on weapons station 42 and includes two mounts, one of which includes the specific hole pattern originally designed for mounting a TOW weapons system in which place the present observation equipment is to be mounted. While the existing hole pattern, vehicle type, and mounting location have been described, the invention is understood to be not limited to the particular embodiment described herein.

With respect to a type of observation equipment to be used, night vision equipment such as the five (5) night sights in the AN/TAS-6 series is the observation equipment of the preferred embodiment, although any type of observation equipment can be utilized.

This preferred embodiment is not intended to restrict the invention to the precise embodiment or embodiments described.

Industrial applicability of this invention includes but is not limited to: boarder patrol and surveying (including landscape and wildlife observation).

I claim:

1. An assembly for adaptably and releasably mounting observation equipment on an existing vehicle mount comprising:

an adaptor having upper and lower annular portions, wherein said upper portion includes an open circular area having inner and outer sidewalls with a first radially extending flange projecting outwardly from the outer sidewall proximate to the top of the upper annular portion, and wherein the lower annular portion includes a lower open annular area with inner and outer sidewalls integral to the bottom one, and with a common inner sidewall to, the upper open circular area, wherein said lower open area includes a second radially extending flange projecting inwardly from the lower open annular area inner sidewall proximate to the bottom of said lower open annular area, with said second flange including holes therein for mating the adaptor to an existing hole pattern on a vehicle mount, and wherein said lower annular area further includes retaining elements mounted to said outer sidewall of said lower open annular area for releasably coupling a clamp ring to effect the mounting of equipment to a vehicle;

a clamp ring including a generally circular crimped band around which is coupled a tension rod for releasably tensioning said circular crimped band, with clip elements coupled to said tension band which correspondingly engage with the respective retaining element of said adaptor, whereby upon closing the tension band, the tension band will bias the crimped inner band to engage a base portion of the equipment being mounted which is set solely on the top surface of the flange of the upper open circular area, while releasing the tension band allows the released clamp ring to be loosely held in place by the retaining elements.

2. The assembly of claim 1, wherein said outer sidewall of said lower open annular area further includes:

a third radially extending flange projecting outwardly from the lower outer annular area outer sidewall, with said third flange including further holes for mating the assembly to the existing hole pattern on a vehicle mount.

* * * * *